United States Patent
Kaas (12)

(10) Patent No.: US 6,451,209 B1
(45) Date of Patent: Sep. 17, 2002

(54) METHOD AND A SYSTEM FOR THE TREATMENT OF WATER

(76) Inventor: Povl Kaas, Th. Nielsens Gade 11 G, Herning (DK), DK-7400

( * ) Notice: Subject to any disclaimer, the term of this patent is extended or adjusted under 35 U.S.C. 154(b) by 0 days.

(21) Appl. No.: 09/605,727

(22) Filed: Jun. 28, 2000

Related U.S. Application Data

(63) Continuation-in-part of application No. PCT/DK98/00584, filed on Dec. 29, 1998, now abandoned.

(30) Foreign Application Priority Data

Dec. 29, 1997 (DK) .............................................. 1550/97

(51) Int. Cl.⁷ .............................. C02F 1/32; C02F 1/44; C02F 9/00
(52) U.S. Cl. ..................... 210/650; 210/652; 210/748; 210/805; 210/806; 210/169; 210/195.2; 210/257.2; 210/263; 210/295; 422/22; 422/24
(58) Field of Search .............................. 210/169, 257.2, 210/263, 295, 748, 805, 806, 195.2, 650, 652; 422/22, 24

(56) References Cited

U.S. PATENT DOCUMENTS 4,372,860 A    2/1983   Kaas .......................... 210/748

FOREIGN PATENT DOCUMENTS

| DK | 2867/89 A | 12/1990 |
|----|-----------|---------|
| WO | WO96/11170 | 4/1996 |
| WO | WO97/29995 | 8/1997 |

OTHER PUBLICATIONS

Derwent's Abstract, Accession No. 95–298411, Week 9539, (Toray Ind Inc) & Pat Abstract of JP 7195097, vol. 95, No. 11, Dec. 26, 1995.

Primary Examiner—David A Reifsnyder
(74) Attorney, Agent, or Firm—Jacobson Holman, PLLC

(57) ABSTRACT

According to a method and a system for purifying bathing water for a swimming pool (1), water is passed through a filter (2) for filtration of the water. A subflow (6) of the filtered water on the downstream side of the filter is passed through a UV system (3) for photochemical treatment. A second subflow (7) of photochemically treated water is withdrawn from the first subflow (6) for nanofiltration or reverse osmosis treatment in a membrane filter device (4). The invention makes it possible to remove carcinogenic substances, such as THM and AOX from the water. A method according to the invention may also be used for removing biocides, pesticides and peroxides, in order to prepare water for drinking.

18 Claims, 1 Drawing Sheet

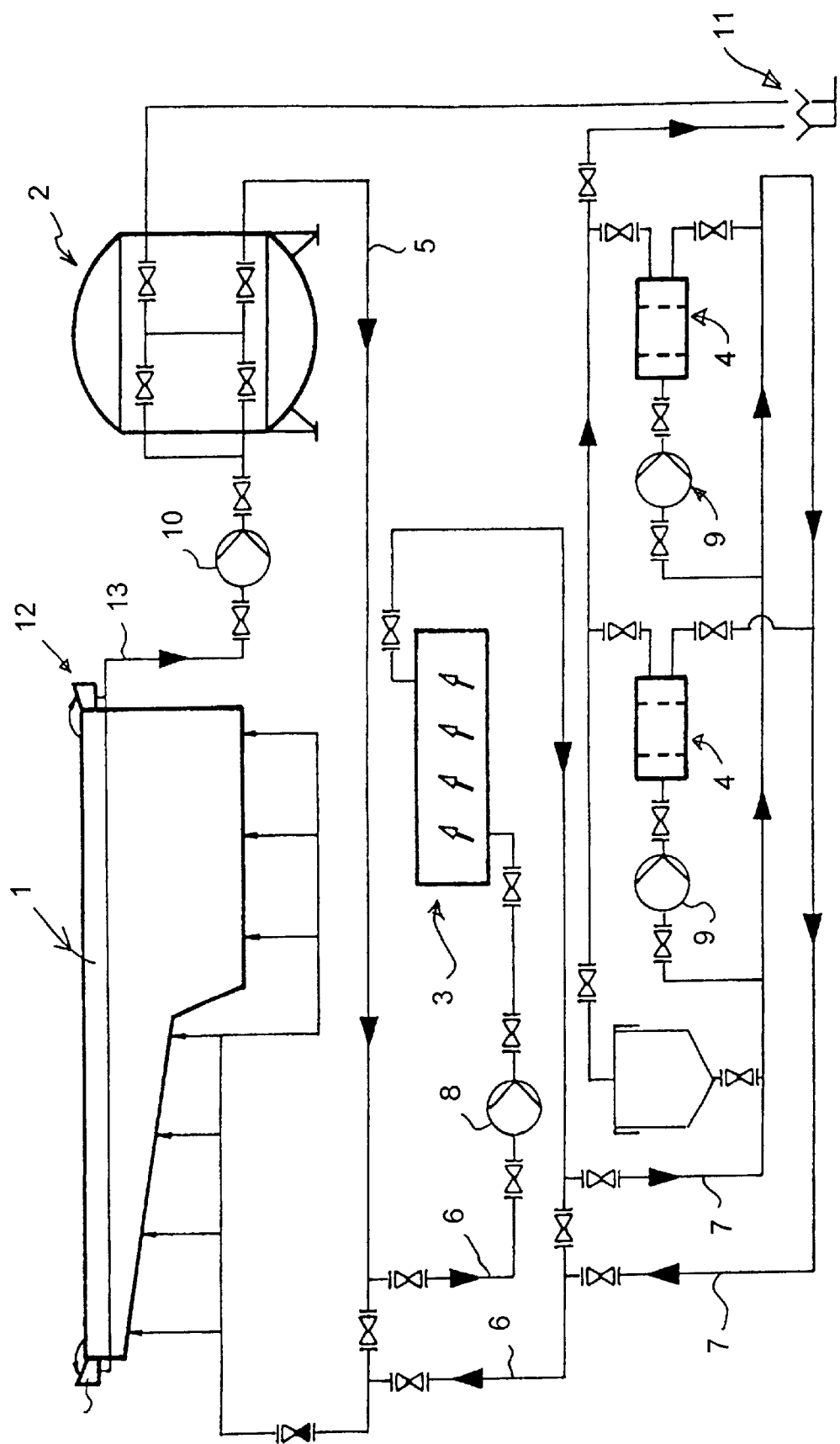

US 6,451,209 B1

METHOD AND A SYSTEM FOR THE TREATMENT OF WATER

CROSS-REFERENCE TO RELATED APPLICATIONS

This is a continuation-in-part of International Patent Application PCT/DK98/00584 with an international filing date of Dec. 29, 1998, now abandoned. This application is based on application Ser. No. 1550/97 filed in Denmark on Dec. 29, 1997, the contents of which are incorporated hereinto by reference.

BACKGROUND OF THE INVENTION

1. Field of the Invention

The present invention relates to a method and a system for the treatment of water. The invention has particular utility for the purpose of purifying chlorinated bathing water for use in a swimming pool but also for purpose of purifying water for other uses such as for preparing drinking water.

The invention more particularly relates to a method and a system of purifying a flow of water.

In e.g. swimming pools, chlorine is added to the bathing water as a disinfectant. This, however, causes formation of bound chlorine in the form of e.g. nitrogen-bound chloramines, which give obnoxious smells as well as irritation of eyes, mucosae and skin, just as these substances may constitute a health hazard for the bathers.

It has moreover been found, however, that the addition of chlorine to bathing water causes formation of THM (Trihalomethanes) and AOX (Adsorbable Organic Halogens), AOX typically in about 10–15 times larger amounts than THM. THM and AOX are generic names for substances of which most are carcinogenic. This is a concern in relation to swimming pools, since both THM and AOX are odorless substances and do not give the irritations known from the chloramines. This means that the bathers do not discover the presence of the substances.

It has been known for some years that THM is formed in chlorinated bathing water, and some regulatory bodies have fixed limit values for THM. To reduce the amount of both THM and chloramines in bathing water, the art comprises a method where active carbon is dosed on the top of a sand filter, which is installed to purify the water. The sand filter, which per se does not remove the chloramines and the THM substances, thereby also retains these substances along with particles and suspended solids in the bathing water.

The sand filter can then be back-washed, which procedure must be carried out frequently, e.g. almost every other day. The active carbon, however, turns into large amounts of sludge that have to be disposed of, which may be a problem, since, at several places, it is forbidden to flush active carbon out into the sewer. Moreover, this method involves the risk that bacteria may grow within the sand filter.

In this method, however, AOX is not removed in sufficient degree to avoid a health concern. With respect to the fixing of limit values of AOX, it is a predicament that today no reliable and economic method of removing AOX is available. Thus, mostly, the concentration in the bathing water is reduced by dilution with make-up water, in which AOX is formed in smaller amounts than in chlorinated bathing water.

Generally, this method of reducing the concentration of both the chloramines, THM and AOX is undesirable, since at most places drinking water is used as a dilution solution to the problems of too high concentrations.

Furthermore, drinking water is usually used for backwashing the sand filters. Particularly when the sand filter is dosed with active carbon, it must frequently be backwashed. Thus, substantial amounts of drinking water are used for the purification process, which makes the purification process extremely costly, in addition to the fact that it is a waste of resources to use drinking water for this purpose.

2. Description of the Prior Art

DK-B-144 663 discloses a method of removing chloramines from chlorinated water in swimming pools by intensive irradiation of the water with ultraviolet light at a wavelength of $\lambda > 300$ nm. However, the photochemical method according to DK-B-144 663 does not remove THM and AOX in sufficiently large degrees for the occurrence of the substances to be reduced to an acceptable level in the swimming pools.

Patent Abstracts of Japan, vol. 95, no 11, JP-A 7 195 097 discloses a method for purifying overflowing water in a pool, in which method water flows to a filter and the filtered water is irradiated with ultraviolet rays by an ultraviolet irradiation device. The obtained purified water is returned to the pool and reused.

Accordingly, it is an object of the invention to provide a method capable of removing bound chlorine (chloramines), THM and AOX from the water. It is a further object of the invention to provide a method that is energy efficient and resource saving in use.

It is a still further object of the invention to provide a system that is suitable for removing bound chlorine (chloramines), THM and AOX from the water, which system is energy efficient and resource saving in use.

SUMMARY OF THE INVENTION

The invention in a first aspect provides a method of treating a flow of water, comprising passing said flow of water through a filter device for filtration of the water, withdrawing from said flow of water at a stage downstream of said filter device a first subflow, passing said first subflow through a UV treatment system, treating said first subflow of water in said UV treatment system with electromagnetic radiation from one or more UV lamps, withdrawing from said first subflow at a stage downstream of said UV treatment system a second subflow of water and passing said second subflow of water through a membrane filter device, which membrane filter device is adapted for effecting a treatment by nanofiltration or reverse osmosis.

By the method according to the invention both THM (Trihalomethanes), chloramines, AOX (Adsorbable Organic Halogens) may be removed from the water that is filtered through the filter device, which is preferably a sand filter.

It is hereby possible to remove the carcinogenic substances from the bathing water in swimming pools or the like. A method according to the invention may in fact also be used for removing biocides, pesticides and peroxides, which makes the method according to the invention suitable for purification of water to produce drinking water, e.g. by the treatment of polluted groundwater.

By withdrawing the second subflow and using a membrane filter after the water has been photochemically purified, it is ensured that the membrane filter just has to remove THM and AOX as well as biocides, pesticides and peroxides, if any, as the chloramines have already been decomposed. This means that the membrane filter can operate at a relatively low pressure of about 7 to 15 bars against about 60 bars, if also the chlorine-bound substances were to be removed, which results in an extremely long service life of the membrane filter. Thus a service life of 3–5 years may be expected against the normal 6–8 months. This is achieved also because the water pressed through the membrane filter is filtered water having a particle content limited to particle sizes of below 1–1.5 $\mu$m. Most loading substances for the filter system used are minimized because of the sand filtration and because of the OH⁻ (radical) ion.

The method according to the invention thereby permits the intervals between the back washings of the sand filter to be prolonged considerably, so that even highly loaded swimming baths only have to be backwashed once a week at a maximum. This results in a great saving of water.

The branching of the second sub flow after the water has been treated photochemically means that the water in the second sub flow will be free of active chlorine, chloramines and part of the THM and AOX, which the photochemical process can degrade. The water is thus without oxidation substances which might otherwise destroy the membrane filters, which is the next step according to the invention. The oxidation substances are activated in the UV system, which causes them to be degraded, the degradation taking place via the formation of OH⁻ (radical), which is the strongest ion in water for oxidation. Extremely clean water is achieved hereby.

According to the invention, the first sub flow is treated with energy-rich photochemically effective electromagnetic radiation in selective wavelengths, which essentially correspond to the values of the absorption energy level for each of the contaminants in the water, such as e.g. chloramines and similar chlororganic compounds.

The invention, in a second aspect, provides a system for the treatment of a flow of water comprising a pipe string for conveying said flow, a filter device on said pipe string, a first substring branched from said pipe string downstream of said filter device and adapted for conveying a first subflow, a UV treatment system on said first substring adapted for photochemical treatment of said first subflow, a second substring branched from said first substring downstream of said UV treatment system, and at least one membrane filter arranged on said second substring, which membrane filter is adapted for removing compounds dissolved in the water, such as THM, AOX and/or salts.

This system is useful in implementing the method explained above.

According to a preferred embodiment of the invention in this aspect, the UV system is a reaction container with one or more metal halide vapor lamps, which are doped with one or more metals, for emission of electromagnetic radiation in the selective wavelengths. This provides an energy-saving UV photochemical treatment, as the lamp type may be arranged to preferably emit electromagnetic radiation in the form of ultraviolet light in precisely those wavelengths that correspond to the undesired chemical compounds in the water.

According to a preferred embodiment, the system comprises at least one lamp arranged at an inlet pipe and at least one lamp arranged at an outlet pipe of the reaction container. This allows for a simple structure of a reaction container for the UV system. The lamp or lamps are positioned in such a way that the water has a sufficient residence time relatively to the energy of the lamp and the turbidity of the water. In case of two or more lamps, the lamps are also distributed relative to the circumference, when the lamps are arranged at the ends of the reaction containers. In embodiments where the lamps are arranged longitudinally of the reaction containers, the lamps are divided in relation to the length of the reaction container.

According to a preferred embodiment, the photochemically treated water is pumped actively through two membrane filters for nanofiltration or reverse osmosis treatment by way of two pumps, a pump being arranged upstream of each filter.

BRIEF DESCRIPTION OF THE DRAWING

The invention will be described more fully below with reference to the accompanying drawing, in which the figure shows a diagram of a filtration system according to the invention for filtration of bathing water in a swimming pool.

BEST MODE FOR CARRYING OUT THE INVENTION

The FIGURE is schematic and not necessarily to scale and illustrate only those parts which are essential in order to enable those skilled in the art to understand and practice the invention, whereas other parts are omitted from the drawings for the sake of clarity.

Reference is now made more particularly to the figure for a description of a system according to the invention.

A swimming pool 1 is fitted with an overflow channel 12, through which the bathing water runs out into the purification system. The water is pumped from the overflow channel 12 through a pipe 13 into a sand filter 2, a feed pump 10 being inserted in the pipe 13. This feed pump 10 is adapted to the capacity of the sand filter 2. Typically the feed pump has a capacity of about 250 m³ per hour in a typical combination swimming bath of 25×16 m for non-swimmers and swimmers.

The filtered water is conducted from the downstream side of the sand filter 2 through a pipe string 5 back into the pool 1. A first substring 6 is branched from this pipe string 5, by which a first subflow is withdrawn from the flow in the pipe string 5 for photochemical treatment. A UV system 3 is inserted in this substring 6 for photochemical treatment of the fed filtered water from the sand filter 2. The first subflow constitutes about 20% of the filtered water in the return string 5 to the pool 1. The size of the first subflow is regulated by suitable valve devices. The water is pumped through the UV system 3 by a pump 8, which is inserted in the first substring 6, the capacity of the pump being adapted to the capacity of the UV filter 3. This capacity is 50 m³ per hour in a preferred embodiment of a combination bath of 25×16 m.

The UV system 3 degrades the active chlorine, the nitrogen-bound chlorine (chloramines) and only a minor portion of the organic bound chlorine (THM and AOX), which are present in the filtered water. The UV system comprises a reaction container in which at least one UV metal halide lamp is arranged both in the inlet and in the outlet in the container. The photochemical lamps are all of the same type, which means that it is not necessary to stock many different types at each installation site.

According to a preferred embodiment of the invention, the lamp type is an intermediate pressure lamp, which is a special metal halide vapor lamp doped with various metals in such a way that the lamp emits as much energy as possible in the wavelengths which are effective for the photochemical process. These wavelengths depend on the substances that are to be removed, and with the preferred lamp type it is possible to select the wavelengths that correspond to the absorption level of the undesired substances that are dissolved in the water. These wavelengths of electromagnetic radiation or UV light will typically be within the range of $\lambda \approx 190–465$ nm, but may also be outside this range if appropriate in view of the absorption characteristics of the undesired substances.

At a stage of the first substring after the water has been treated photochemically, a second subflow is withdrawn from the first subflow, and passed into a second substring 7. The amount withdrawn from the first subflow must not be larger than necessary to maintain equilibrium in the pool 1. It will preferably be about 10–15% of the first subflow in case of a 25×16 m combination bath.

This second substring 7 has inserted therein a membrane filter 4 and a suitable arrangement of valve units for controlling the flow. In the embodiment shown, two membrane filters 4 are arranged in series with respective pumps 9 arranged immediately upstream of each of the filters 4. These pumps 9 are selected to yield a pressure of about 15 bars and a capacity that corresponds to the associated membrane filter 4, preferably about 3.75 $m^3$ per hour. The water in the second subflow is passed through a membrane filter, whereby a reverse osmosis treatment takes place. At the low pressures used in reverse osmosis systems (only about 7 to 15 bars against the usual about 60 bars), the membrane filters have a considerably longer service life, and a saving in power consumption is obtained.

In another embodiment, the two membrane filters may be arranged in parallel and optionally have a common pump. In still other embodiments, suitable e.g. in a purification system for smaller pools a single membrane filter 9 is arranged in the substring 7.

The membrane filters 9 are connected with an outlet 11 where the filtered concentrate is discharged.

The system explained basically operates as follows. The water from the pool overflow is filtered in the sand filter 2, whereby inter alia suspended solids and other particles larger than 1–1.5 $\mu$m are filtered. Then a first subflow of this filtered water is treated photochemically to degrade the chlorine-related substances in the water. A further subflow is withdrawn from the first subflow at a stage downstream of the photochemical treatment unit and subjected to a reverse osmosis process to filtrate the "true" solutions in the water, thereby removing the carcinogenic substances THM and AOX from the water of the second subflow. The filtered water of the second subflow is then returned to the pool.

This provides a method and a system for purifying swimming bath water, wherein dilution is no longer the only remedy to the problems of reducing the concentrations of the undesired substances, be it the chloramines and the other chlorine compounds, THM and AOX, below the desired levels of concentration, such as the limit values where such prevail.

I claim:

1. A method of treating a circulated flow of chlorinated water from a swimming pool to remove chloramines, trihalomethanes and adsorbable organic halogens, said method comprising passing said flow of chlorinated water through a filter device for filtration of the water, withdrawing from said flow of water at a stage downstream of said filter device a first subflow, passing said first subflow through a UV treatment system, photochemically treating said first subflow of water in said UV treatment system with electromagnetic radiation from one or more UV lamps, withdrawing from said first subflow at a stage downstream of said UV treatment system a second subflow of water, and passing said second subflow of water through a membrane filter device, which membrane filter device is adapted for effecting a treatment by nanofiltration or reverse osmosis.

2. The method according to claim 1, wherein the step of treating said first subflow comprises irradiating said first subflow with energy-rich photochemically effective electromagnetic radiation in selective wavelengths, which wavelengths essentially correspond to the values of the absorption energy level for at least one contaminant in the water.

3. The method according to claim 2, wherein the contaminant in the water is selected from the group consisting of chloramines and chloroganic compounds.

4. The method according to claim 1, wherein the step of passing said second subflow through said membrane filter device comprises pumping said second subflow through at least two membrane filters for treatment by reverse osmosis or nanofiltration by means of at least two pumps, each one arranged upstream of a respective one of said membrane filters.

5. The method according to claim 1, wherein the step of withdrawing said first subflow comprises withdrawing about 20% of the filter capacity of the filter device.

6. The method according to claim 1, wherein the step of withdrawing said second subflow comprises withdrawing about 10–15% of said first subflow.

7. The method according to claim 1, wherein the flow of water is passed through a filter device constituted by a sand filter.

8. The method according to claim 7, wherein said sand filter is backwashed with intervals of 7 days or more.

9. The method according to claim 1, wherein said first subflow is submitted to a treatment with UV light emitting UV radiation with in the range from 190 to 465 nm.

10. A system for the treatment of a circulated flow of chlorinated water from a swimming pool to remove chloramines, trihalomethanes and adsorbable organic halogens, said system comprising a pipe string conveying said flow of chlorinated water from said swimming pool to a filter device on said pipe string, a first substring branched from said pipe string downstream of said filter device and for conveying a first subflow of water from said filter device, a UV treatment system on said first substring for photochemical treatment of said first subflow, a second substring branched from said first substring downstream of said UV treatment system, and at least one membrane filter arranged on said second substring, the membrane filter removing at least one compound dissolved in the water from the UV treatment system and the water being returned by piping to said swimming pool.

11. The system according to claim 10, wherein said UV treatment system comprises a reaction container with at least one metal halide vapor lamp, doped with one or more metals and adapted for emission of electromagnetic radiation in selective wavelengths, which wavelengths essentially correspond to the values of the absorption energy level for at least one contaminant in the water.

12. The system according to claim 11, wherein said metal halide vapor lamp is a metal halide intermediate pressure lamp.

13. The system according to claim 11, wherein said metal halide vapor lamp is adapted for emitting UV radiation within the range from 190 to 465 nm.

14. The system according to claim 11, comprising at least one lamp arranged at an inlet pipe and at least one lamp arranged at an outlet pipe of said reaction container.

15. The system according to claim 11, wherein the contaminant in the water is selected from the group consisting of chloramines and chloroganic compounds.

16. The system according to claim 10, comprising two membrane filters arranged serially on said second substring and two pumps, each one arranged upstream of a respective one of said membrane filters.

17. The system according to claim 10, wherein said filter device comprises a sand filter.

18. The system according to claim 5, wherein the compound dissolved in the water is selected from the group consisting of trihalomethanes, adsorbable organic halogens, and salts thereof.

* * * * *